Sept. 27, 1960
R. T. GLASS
2,953,997
CONFECTION MACHINE
Filed March 16, 1956
8 Sheets-Sheet 1
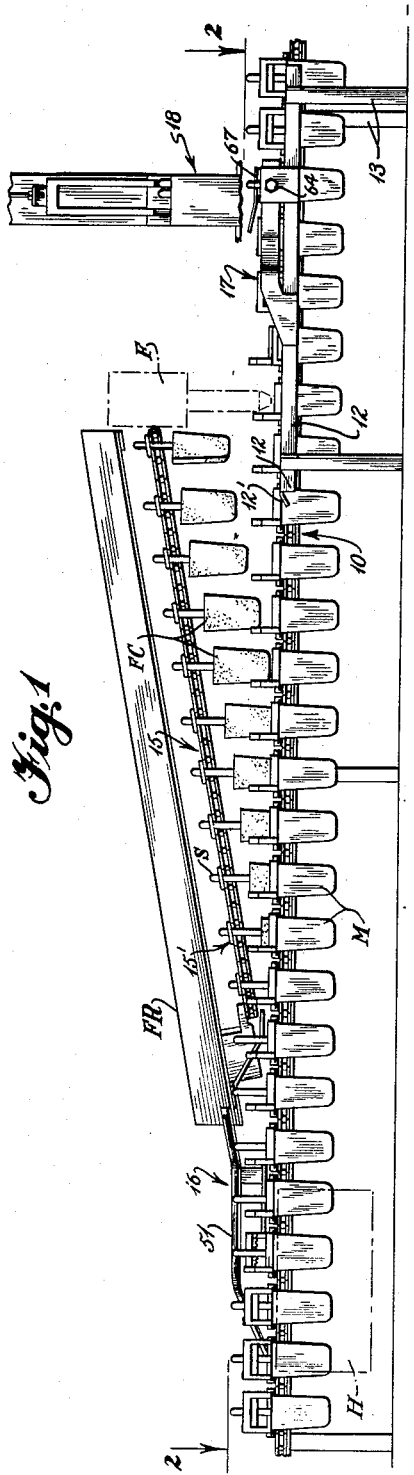
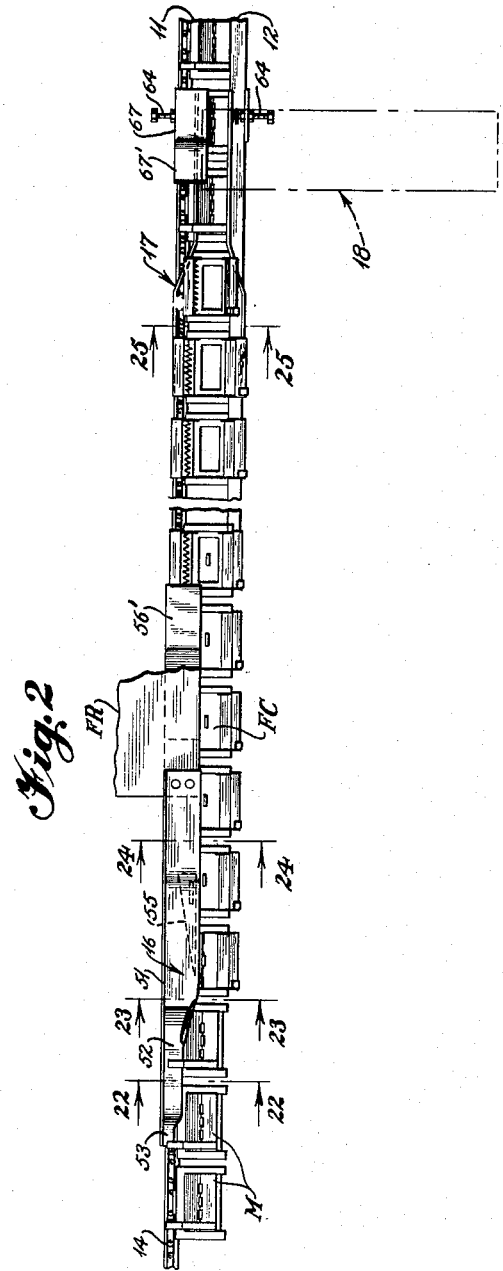
INVENTOR
Robert Taylor Glass
BY Beale and Jones
ATTORNEYS

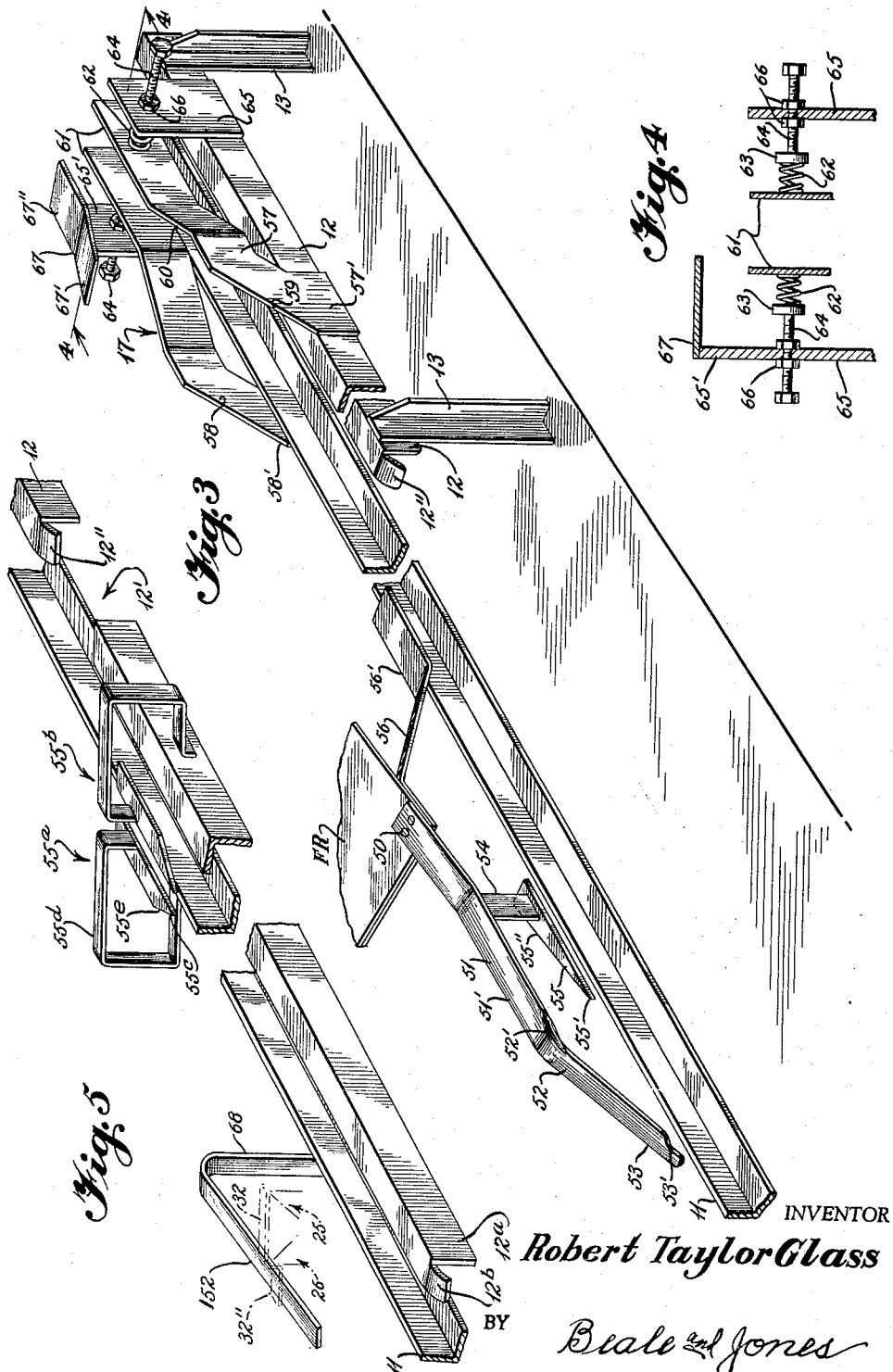

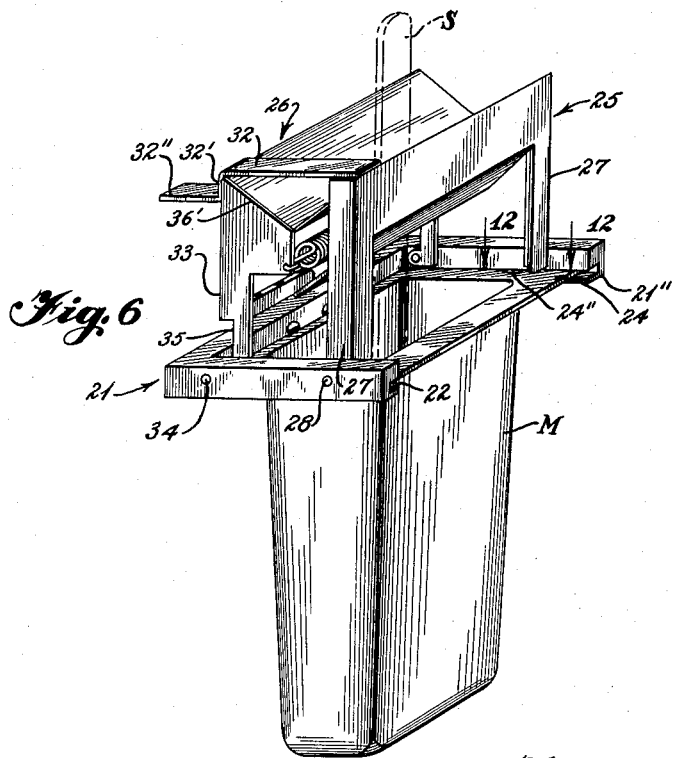

Sept. 27, 1960 R. T. GLASS 2,953,997
CONFECTION MACHINE
Filed March 16, 1956 8 Sheets-Sheet 4
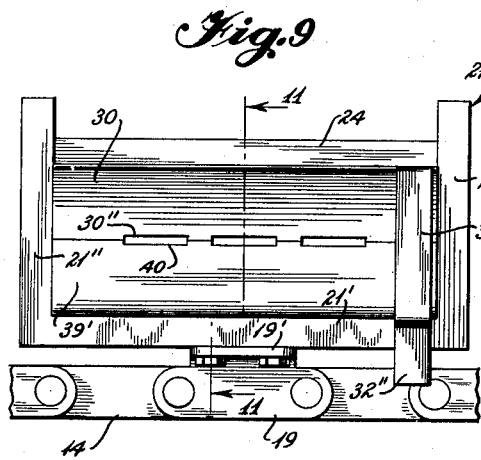
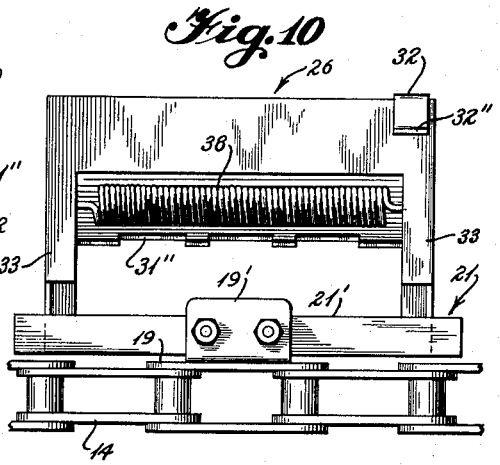
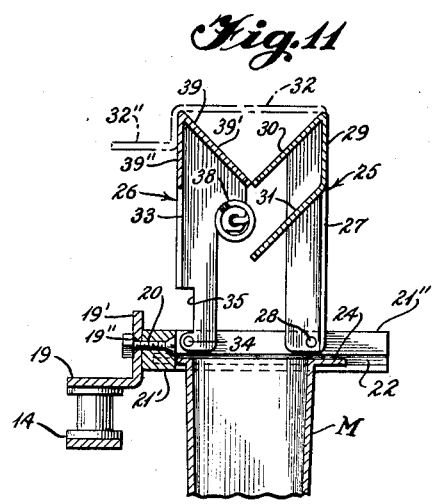
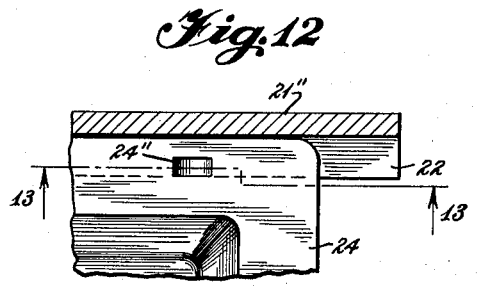
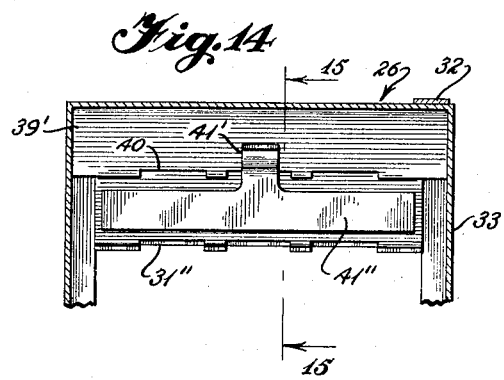
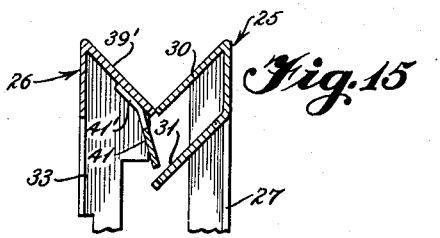
INVENTOR
Robert Taylor Glass
BY Beale and Jones
ATTORNEYS

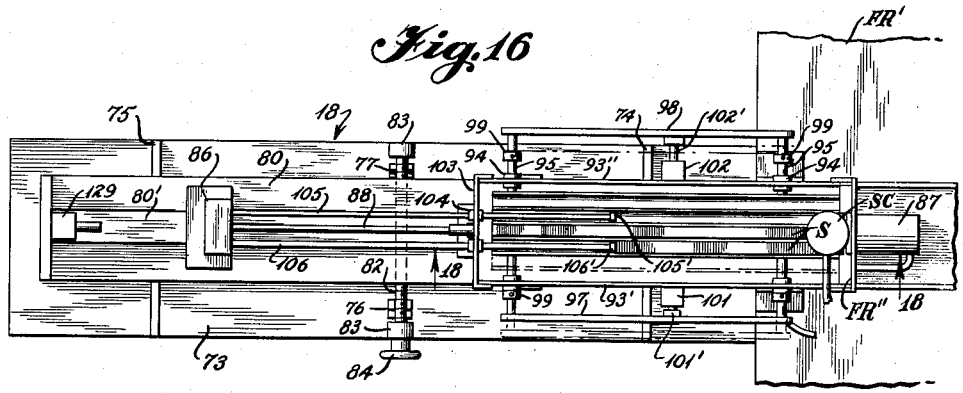
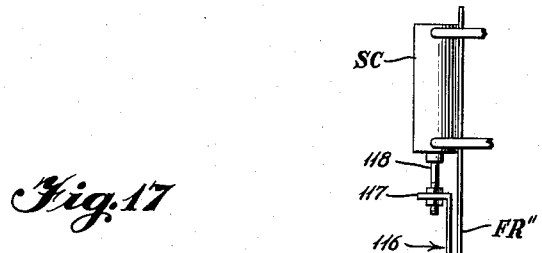
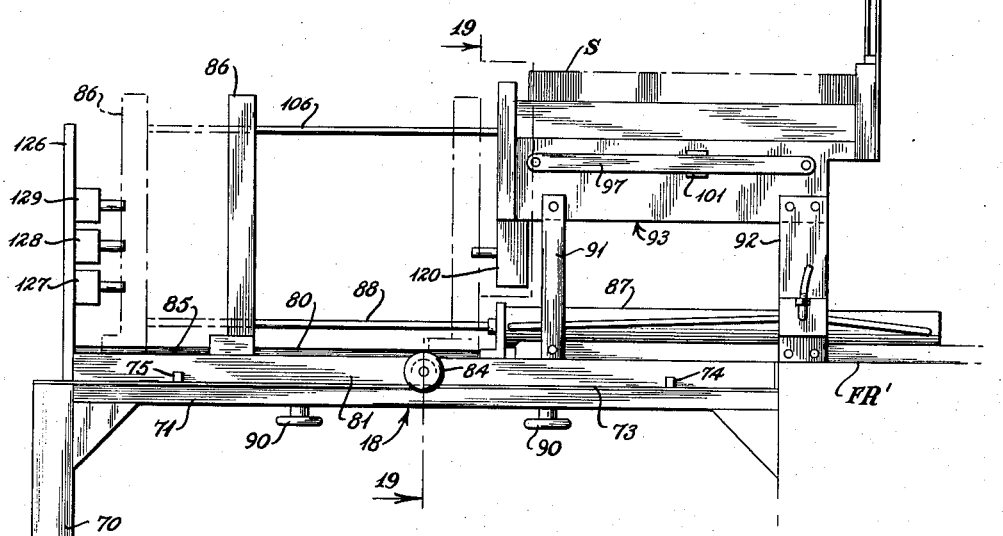
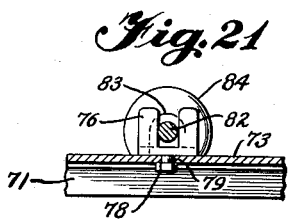

Sept. 27, 1960
R. T. GLASS
2,953,997
CONFECTION MACHINE
Filed March 16, 1956
8 Sheets-Sheet 6
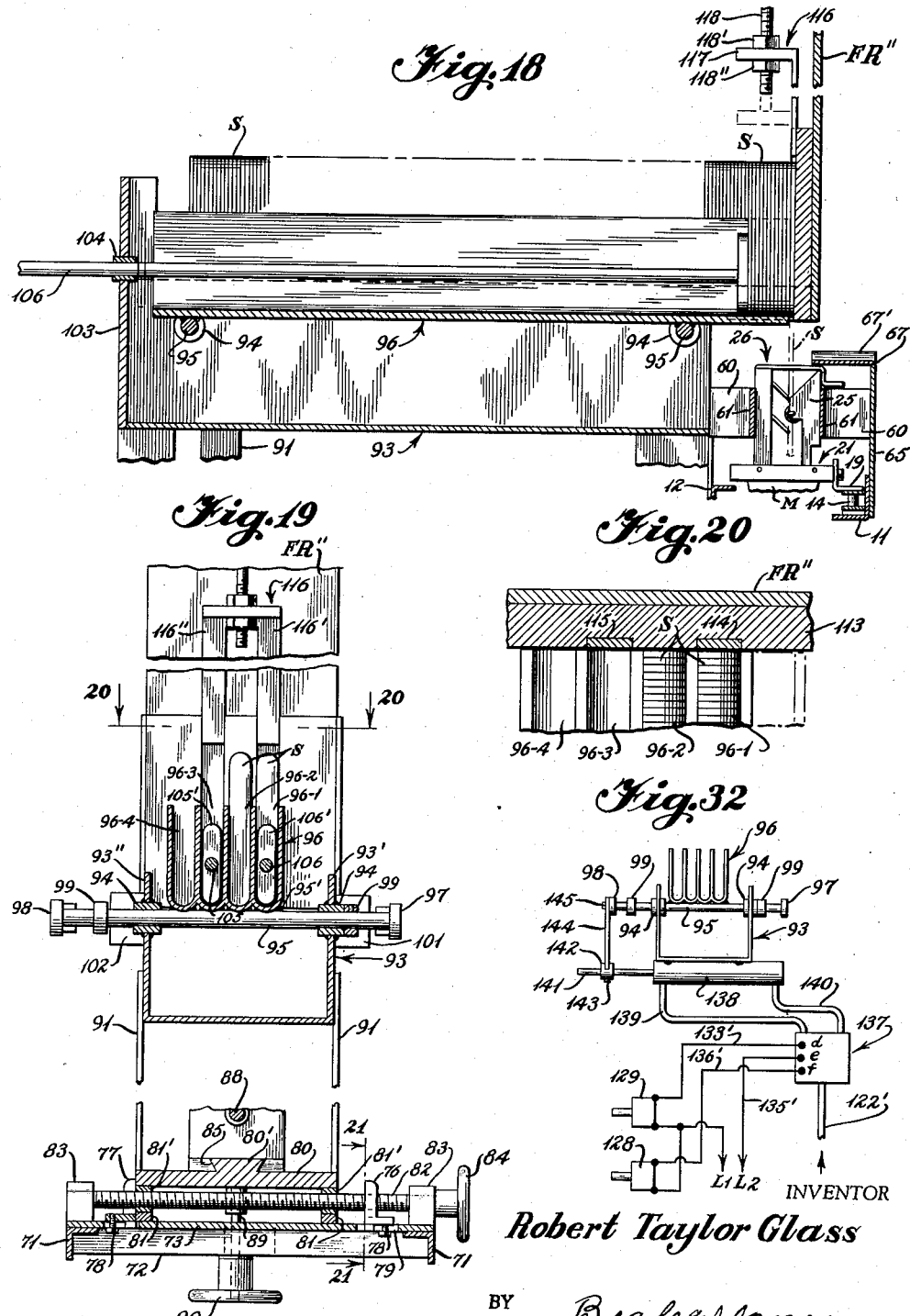
INVENTOR
Robert Taylor Glass
BY Beale and Jones
ATTORNEYS

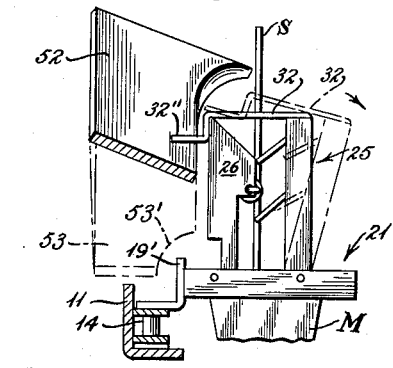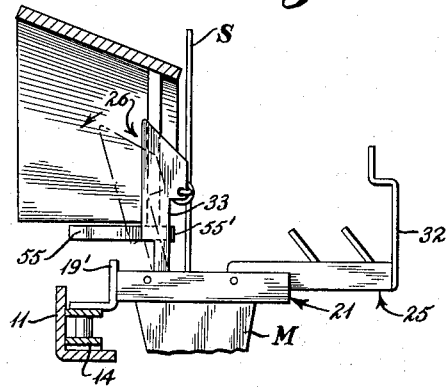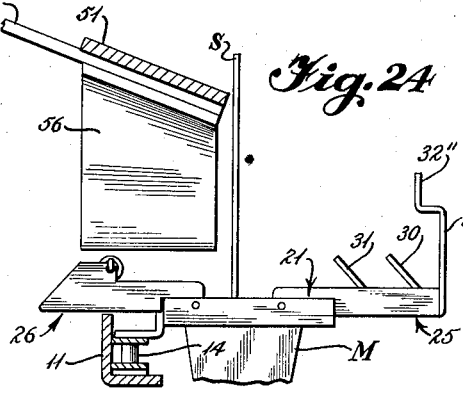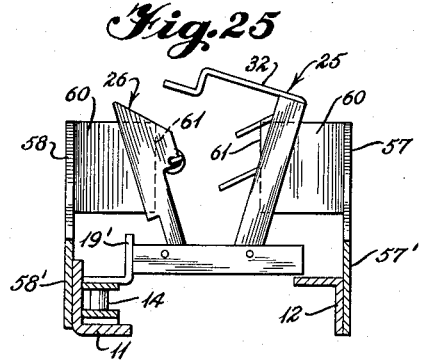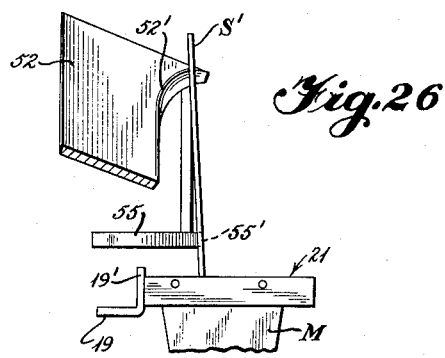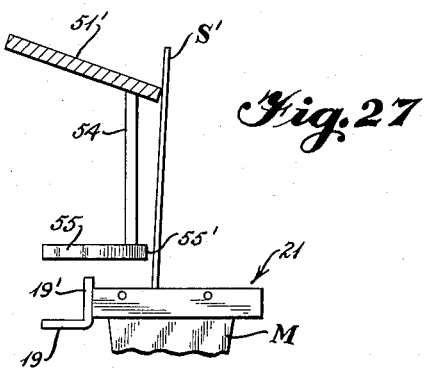

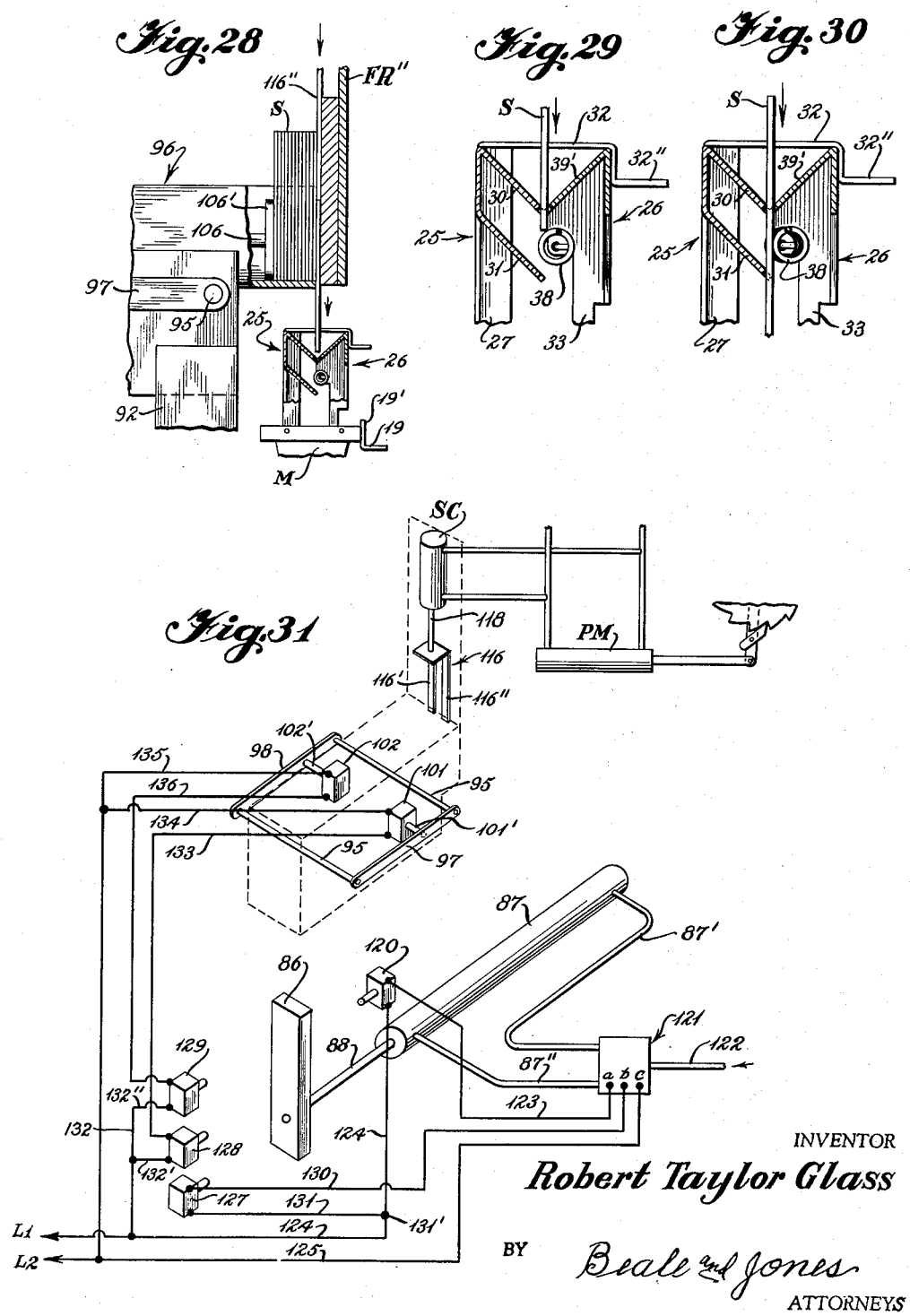

United States Patent Office 2,953,997
Patented Sept. 27, 1960

2,953,997

CONFECTION MACHINE

Robert Taylor Glass, 409 W. 6th St., Austin, Tex.

Filed Mar. 16, 1956, Ser. No. 572,084

17 Claims. (Cl. 107—8)

My invention is directed to improvements in confection machines and particularly an endless carrier for molds having means for supporting confection sticks within the molds and releasing the same together with means for inserting sticks in the molds.

An object of my invention is to provide an endless conveyor type confection machine carrying removable molds having cooperating movable stick holders above the molds for supporting sticks therein and means for moving the stick holders to support and non-support stick position together with means for inserting the stick.

Another object of my invention is to provide an endless type conveyor for confection making in which the sticks are inserted in molds along with confections and wherein means are provided for straightening sticks to prevent injury to the mechanism.

A further object of my invention is to provide a stick holder comprising a pair of cooperating pivotal members positioned above a mold holder and mold.

Another object of my invention is to provide a mold of metal having a vertical tapered pocket body portion and a peripheral horizontal flange about the top of the body portion.

Another object of my invention is to provide a mold holder which will receive and release a mold having a peripheral horizontally disposed flange about the upper portion of a body defining a vertical pocket in the mold.

A further object of my invention is to provide in a confection machine a sticker mechanism for holding a plurality of rows of sticks which may be selectively brought into position under fingers for inserting the sticks into molds movable therebelow.

A still further object of my invention is to provide in a confection machine a sticker having a movable tray with a plurality of elongated stick receiving passages wherein selective passages may be brought into stick inserting position while other passages are being refilled with sticks.

Still further objects and the entire scope of applicability of the present invention will become apparent from the detailed description given hereinafter. It should be understood, however, that the detailed description and specific examples are given by way of illustration only, and while indicating preferred embodiments of the invention are not given by way of limitation, since various changes and modifications within the spirit and scope of the invention will become apparent to those skilled in the art from this detailed description.

For a more complete understanding of the nature and scope of my invention, reference may be had to the drawings in which the figures are described as follows:

Fig. 1 is a side elevation of a portion of the confection machine showing the removing of the confections from the molds, the filling stage and the stick insertion stage;

Fig. 2 is a fragmentary plan view on a slightly enlarged scale viewed from line 2—2 of Fig. 1;

Fig. 3 is an isometric view on a further enlarged scale of a portion of the track in Fig. 1 and 2 but with the chain and molds removed to illustrate the cams which open and close the stick holder clamps for the molds;

Fig. 4 is a fragmentary sectional view along line 4—4 of Fig. 3 showing the side and top cams for closing the stick holders;

Fig. 5 is an isometric view of a modified form of opener for the stick holder clamps and modified form of cams for further opening and holding the pivoted stick holder portions open;

Fig. 6 is an isometric view of the mold, mold holder, and pivoted stick holder clamps;

Fig. 7 is an exploded view showing a mold holder bracket and a fragmentary portion of the upper end of a mold ready to be received into said bracket;

Fig. 8 is an isometric view similar to Fig. 6 with the stick holder clamps pivoted to open position;

Fig. 9 is a plan view of a fragmentary portion of a conveyor chain having attached thereto a mold and stick holder;

Fig. 10 is a side elevational view of Fig. 9 looking into the chain side;

Fig. 11 is a cross-sectional view along line 11—11 of Fig. 9 showing also the upper fragmentary portion of the mold inserted into the mold holder;

Fig. 12 is a fragmentary view of a side leg of the mold holder with the flange of the mold in its locked in position;

Fig. 13 is a sectional view along line 13—13 of Fig. 12 showing the upper portion of the mold holder and fragmentary portion of the leg of one of the pivotal stick holder members;

Fig. 14 is a vertical cross-sectional view just inside of the left hand side of Fig. 11 but showing a modified form of flat spring in place of coil spring;

Fig. 15 is a cross-sectional view along line 15—15 of Fig. 14 showing the stick holder clamps and the mounting of the flat spring on the rear pivoted stick holder member;

Fig. 16 is a top plan view on an enlarged scale of the sticker shown generally at the right hand end of Fig. 1;

Fig. 17 is a side elevational view of the sticker shown in Fig. 16;

Fig. 18 is an enlarged sectional view along line 18—18 of Fig. 16 showing the stick holder tray with sticks therein and a stick being inserted into the stick holder above a mold;

Fig. 19 is a fragmentary sectional view along line 19—19 of Fig. 17 on an enlarged scale showing the adjustable support for the stick holder tray;

Fig. 20 is a cross-sectional view along line 20—20 of Fig. 19 on an enlarged scale depicting the top edge of a row of sticks and the vertical guide slots in the sticker mechanism;

Fig. 21 is a cross-sectional view along line 21—21 of Fig. 19 showing an adjustable stop to limit one sideways movement of the stick holder tray support;

Fig. 22 is a fragmentary cross-sectional view along line 22—22 of Fig. 2 on an enlarged scale showing the top catch for the stick holders being cammed open;

Fig. 23 is a view similar to Fig. 22 but along section line 23—23 of Fig. 2 on an enlarged scale showing the front stick holder pivoted clockwise to open position and the cam opening the rear stick holder;

Fig. 24 is a view similar to view 23 but along line 24—24 of Fig. 2 and on an enlarged scale with a cam holding the rear stick holder open;

Fig. 25 is a cross-sectional view along line 25—25 of Fig. 2 on an enlarged scale showing the pivotal stick holder elements moving into closed position by action of closing cams;

Fig. 26 shows a portion of the cams of Fig. 23 and their relationship to move a tilted stick in a frozen confection;

Fig. 27 is a view similar to Fig. 26 but with the mold and stick of Fig. 26 moved further along showing the stick in a frozen confection tilted by action of the upper cam so as to clear the lower cam;

Fig. 28 is a fragmentary sectional view showing a group of sticks in the stick holding tray with a stick being inserted into the stick holder above the mold;

Fig. 29 is a fragmentary enlarged view similar to the mold in Fig. 28 and the stick holder showing a stick being thrust down into the stick holder;

Fig. 30 is a view similar to Fig. 29 showing the stick further down in the stick holder;

Fig. 31 is a diagrammatic wiring diagram and pneumatic power diagram for stick and main operating mechanism of the machine; and Fig. 32 is a diagram showing a modified form of actuator to move the stick tray back and forth which consists of a single power cylinder arrangement.

Throughout the description that follows in this specification like reference numerals refer to similar parts.

Referring to Fig. 1 a portion of a frozen confection machine is generally indicated at 10 having longitudinal rails 11 and 12 indicated in Fig. 2 which are supported by spaced apart vertical legs 13 formed of angle iron members with longitudinal member 11 supporting an endless chain 14. In the portion of the machine disclosed and to which this invention relates there is generally indicated at 15 a cross conveyor chain which pulls the frozen confections FC by means of the stick S frozen therein from the molds M which are spaced apart and attached to the chain 14 as will hereinafter be described. In addition to the above just described as a portion of the frozen confection making machine, there is a heater H shown in outline at the left hand end of Fig. 1 which heats the molds and loosens the confections therein so that the cross chain 15 and the pullers 15' thereon (see my U.S. Patent No. 2,894,652, issued July 14, 1959) may pull the frozen confections from the molds M. Cam means generally indicated at 16 and in the general area of the heater H serve to release and pivot the stick holders, as will hereinafter be described and as best shown in Figs. 6, 7, and 8, so that the pullers 15' may engage the sticks S. Also shown in the machine as a part thereof is a filler F which fills the molds with confection fluid after the stick holders have been opened and the frozen confection FC removed by pulling so that a new confection may be frozen. Typical freezing compartments are shown in my copending application Serial No. 398,100, filed December 14, 1953, allowed June 26, 1959. After the molds M have been filled they pass to a cam station generally indicated at 17 where the stick holders for the molds are closed and pass under a sticker generally indicated at 18 which inserts the sticks S into the stick holders such that each protrudes down into the mold and into the fluid confection material placed therein by the filler F.

In Figs. 3 and 5 it will be noted that the longitudinal angle rails 11 and 12 are supported by the vertical legs 13. Longitudinal angle member 11 serves as a guideway to receive endless chain 14 which rides therealong and as shown in Fig. 11 has a series of spaced angle brackets 19 attached thereto and each provided with an upstanding lug 19', see also Figs. 9 and 10, and wherein the angle bracket 19 serves as one of the top links of the chain. The upstanding lug 19' of bracket 19 has a pair of spaced apart apertures 19" therein which receive securing screws 20 that hold the U-shaped mold receiving bracket generally indicated at 21 along its bight portion 21' while the legs 21" extend outward therefrom. Mold receiving bracket 21 has a pair of grooves 22 cut into the inside face of the legs and the bight 21' so as to receive the top flange 24 of the mold M. Note that this flange 24 which extends horizontally at the top of the mold M is recessed as at 24' to be received about the bight portion 21' of the mold receiving bracket adjacent screws 20. In the legs 21' of the mold bracket 21 there are formed dwells 23' in the lower edges of the grooves 22 thereof to receive and catch tabs 24" punched downwardly from the flange 24 on either side thereof.

The mold is formed of tin coated copper or other suitable heat and cold conducting material and has a smooth appearance without seams as it may be fabricated by being drawn from a plate. This enhances the sanitary features of the mold, provides through its tapered walls for ease of withdrawal of the frozen confection, permits insertion into and removal from the bracket 21 for replacement by another size of mold if desired yet it is easily washed and is held firmly in place by the dwell 23 and tabs 24" as shown in Fig. 13.

In carrying out the making of frozen confections having sticks inserted therein of the plastic or wooden type provision must be made for holding the stick during the freezing and transfer period. Use is made of the stick for withdrawing a confection after it has been heated in the mold to free same and while the confection is suspended by the stick and carried by the transfer conveyor 15. Conveyor 15 carries the withdrawn confection through the chilling zone and past a coating station (not shown) where the confection is coated, thence back through the chilling zone to a discharge station (not shown) where it is released from conveyor 15.

Reference to Figs. 6 and 8 shows the mold holder bracket 21 having a first stick holder member 25 and a second stick holder 26 mounted thereon in a pivotal manner so as to move transverse to the direction of movement of the mold on the chain 14. The stick holder members 25 are stampings and include vertical legs 27 of right angle cross-section which are pivotally attached to the legs 21" of mold brackets 21 as by rivets 28. Reference to Figs. 8 and 11 shows a transverse member 29 secured between the legs 27 and this member 29 has a pair of parallel spaced apart legs 30 and 31 which extend downwardly at an angle as viewed in Fig. 11 so that their extreme lower edges 30' and 31', see Fig. 8 and Fig. 11, are adjacent a vertical plane extending through the mold M in its longitudinal direction. These edges 30' and 31' have formed therein spaced apart recesses 30" and 31" to receive the sticks S. When making a single stick confection the center recesses 30" and 31" would be used and in case of the double stick confection the outer two recesses would be used as will hereinafter be explained. Affixed to the upper edge of the first stick holder 25 is a transversely extending catch member 32 having a downwardly bent end portion 32' and an extreme tab outer end 32" which catches over the top edge of the second stick holder member 26. Stick holder member 25 may also be termed the front stick holder member as it faces the side of bracket 21 into which the mold is inserted and withdrawn while the stick holder member 26 may also be termed the rear stick holder member as well as the second stick holder member.

Stick holder member 26 is formed with legs 33 which are pivotally affixed to the mold bracket 21 by means of pins 34 at their lower end. The member 26 is a stamping from metal similar to member 25 with notches 35 cut into the rear lower edges of its legs so that the member 26 may be pivoted into a transverse position over the bight portion 21' of the mold holder bracket 21 so as to hold the member 26 in a pivoted lower or transverse position. Still referring to the legs 33 it will be noted that their upper portions are each formed with an inwardly extending lug 36 which is apertured at 37 to receive the ends of a tension spring at 38 serving to hold the sticks S in position by friction. The upper edge of the lug 36 as at 36', see Fig. 6, slants downwardly towards the other stick holder member 25. Between the legs 33—33 and the lug portions 36 thereof there is attached a V-shaped member 39 whose upper plate like portion 39' slants downwardly towards the longitudinal center through the molds where it meets with the member 30 of the first stick holder member 25 while the other portion of the V-shaped member as at 39'' extends between the legs as a reinforcing member. Reference to Fig. 9 shows that the portion 39' has formed therein spaced apart notches 40 on the lower edge thereof which cooperate with the notches 30'' on the first stick holder member 25 to hold the sticks S. It will be observed that the catch 32 as shown in Fig. 6 fits over the rear portion of the second stick holder member 26 to hold the two stick holder members 25 and 26 in closed position. Thus if the tab portion 32'' of the catch 32 is raised up it will release the catch and through the resiliency of the catch 32 the first member 25 will pop or swing to the open position as shown in Fig. 8. Reference to Fig. 11 shows that the slots 30'' and 31'' in the members 30 and 31 respectively of the first stick holder 25 form vertical spaced apart supports for the righthand side of the stick while the cooperating slots 40 in the lefthand member 26 and the tension spring 38 serve to support the other side of the stick. The slots 30'' and 40 match and cooperate as shown in the plan view in Fig. 9.

In Figs. 14 and 15 a modified form of tension spring for holding the sticks in position by friction is shown. This is in the form of a leaf or flat spring 41 of T-shape having the leg of the T at 41' affixed to the underneath side of the member 39' of stick holder member 26 while the cap of the T as at 41'' extends transverse thereto and parallel with the slots so as to press against sticks suspended therein.

*Cam openers and closers for stick holders*

There is shown generally at 16 a cam means for opening the stick holders 25 and 26 so that the confection with the stick frozen therein may be picked up by the pullers 15' on the conveyor 15 thus pulling the frozen confections from the molds M as the cross conveyor 15 transfers them for further treatment as alluded to heretofore. The stick holders above the molds M after passing the cam area 16 are opened and through the area up to the closing cam section generally indicated at 17, the molds M may be replaced if desired by other molds so that the molds may be filled under the filler F as heretofore explained. After passing the filler F and being filled with fluid to be frozen, the stick holders are closed by the cam section generally indicated at 17 and sticks are inserted by the sticker 18; thereafter the molds with stick and confection inserted pass into the freezing zone where chilling air chills and thence freezes the confection in the individual spaced apart molds M.

In Figs. 3 and 5 there are shown two similar sections of the track or guides 11 and 12 with two different cam arrangements. The preferred form is shown in Fig. 3 while the alternative form is shown in Fig. 5. Reference to Fig. 3 shows a framework FR of the machine which has riveted or otherwise secured thereto towards its forward end as at 50 an elongated metal strip generally indicated at 51 which has cam surfaces and depressed portions formed therein and from which is supported a further cam surface as will hereinafter be described. The member 51 has a forward downwardly extending portion which serves as a first cam means portion or section 52 whose downwardly extending portion as at 53 serves to catch any open second stick holder members 26 that may have approached the cam section in an open position and would cause damage were not they moved in a pivotal manner towards the vertical or closed position by this cam portion 53. In order for the cam portion 53 to extend down to adjacent the chain 14, the inboard lower portion as indicated at 53' is cut away in a concave arcuate manner, see Fig. 3. The cam portion 52 is struck by the extending tab 32'' as shown in Fig. 22 and this raises the tab 32'' of the catch 32 and upon movement of the mold from left to right as shown at Fig. 1 and Fig. 2, the catch 32 is sprung open as indicated by the broken line and the full line positions shown in Figs. 22—24. Reference to Fig. 22 shows the cut-off portion 53' being cleared by the upstanding bracket lug 19' affixed to the chain 14 and thus the downwardly extending portion of cam 52 as indicated at 53 will serve to pick up any stick support member 26 which may approach there in an open position. Referring to Fig. 3 and the member 51 there depends from the mid-section 51' of member 51 a downwardly extending bracket 54 which supports a V-shaped horizontal plate 55 whose apex 55' extends to the left and this member 55 is termed the second cam means portion. It will be noted that the extreme apex 55' of cam 55 is to the right of and below cam portion 52 so that when the second stick holder member 26 has moved beyond the cam 52 it is ready to pivot outward to open position as the apex 55' of the second cam 55 strikes inboard of the leading leg 33 of the stick holder 26 and rides against the outboard edge 55'' of the cam thereby pivoting the member 26 to open position. As the chain moves the molds along with the stick holders in open position they approach and come under the bracket member 56 which is attached by the rivets 50 to the frame member FR but extends downward and towards the right of Fig. 3 as contrasted with the bracket member 51 which extends to the left. Bracket 56 has a horizontally extending cam portion 56' which rides over and holds down the stick holder portion 26. Similar means may be provided for holding down the stick holder portion 25 but due to its weight, balance and loading, it stays in the open or down position as shown in Fig. 8 and does not interfere with the puller members 15' on the cross conveyor 15. The mold with the stick holder members 25 and 26 laid open moves on to the right of Fig. 3 as is shown in Figs. 1 and 2. In the position where the cam means 56' holds down the stick holders, the pullers 15' in that area grasp the upwardly extending stick and pull the loosened confection from the mold M. Thereafter the molds are ready to be replaced or refilled before they pass under the filler F. It will be noted that the longitudinal track member 12 is broken away at the downturned portion 12', see Figs. 1 and 5, so that the molds may be removed in that section and replaced by other molds if necessary or removed for cleaning. The longitudinal track portion 12 has a depending leading edge 12'' over which the outer ends of legs 21'' of bracket 21 ride. The cam assembly generally indicated at 17, see Fig. 3, is substantially similar in both forms of cam track construction but only shown in Fig. 3. This cam means 17 forms the third cam means portion or closing means for pivoting stick holder members 25 and 26 into closed position so that the catch 32 will be secured over the stick holder member 26 to hold the members tightly together. It will be observed that this cam closing means generally indicated at 17 and termed the third cam means portion brings the members 25 and 26 to closed position just prior to their passing under the sticker 18. At sticker 18 the holders receive a stick or sticks which protrude down between the stick-holding slots in the members 25 and 26 and adjacent the spring 38 and down into the fluid confection material to be frozen. Reference to Fig. 3 shows right and lefthand side cam members 57 and 58 respectively which are secured along their lower portions as at 57' and 58' to the side rails of 12 and 11 respectively. The third cam means portion or member 57 is symmetrical with the other cam member 58 but oppositely formed and has an upwardly inclined cam portion 59 which rides under the leg of the stick holding member 25 and causes it to pivot into closed position. As the mold with the stick holder members moves along it comes into the narrowing cam portion 60 which is plate-like and extends towards the center between the two tracks 11 and 12 so as to press against the outer surface of the legs 27 to insure that it assumes a vertical position as it is brought towards the other stick holder member 26 between the parallel plate portions 61 of the members 57 and 58. To insure that the members 25 and 26 are tightly closed, resilient biasing means in the form of springs 62 urge the members 61 towards each other. These biasing means 62 are in the form of coil springs supported in cup-like elements 63 on the ends of screws 64 which are in turn supported by upstanding plates 65 attached to the tracks 11 and 12. Locking nuts 66—66 are used to secure the screws 64 in an adjusted position in the plates 65, see Fig. 4. Further reference to Fig. 4 shows that the lefthand side upstanding bracket 65 extends upwardly as at 65' and supports a fourth cam means portion generally indicated at 67 having outwardly extending flat portions 67' and 67" which extend towards the oncoming mold with its stick holding members 25 and 26 superimposed thereabove. This cam portion 67' is in the path of movement of the catch 32 and insures that it is moved down into closed position or locked position over the member 26 as the catch 32 rides against the cam portion 67 down to the horizontal cam portion 67". This fourth cam means portion is not necessary in all cases but is shown in the preferred form of the apparatus in Fig. 3.

Reference to Fig. 5 shows a modified form wherein the first cam means portion is indicated at 152 and it serves to unlatch the catch 32 as the tab 32" thereof moves therealong in a manner similar to the first cam 52 as described in Fig. 3. This first cam means portion in Fig. 5 as indicated in 152 is supported by an upstanding bracket member 68 secured to the longitudinal track member 11 of the framework of the machine. The second cam means portion in Fig. 5 is generally indicated at 55a and 55b. Cam member 55a forming the second cam means is indicated per se at 55c and is supported by a C-shaped bracket at 55d which is supported by the rear longitudinal member 11 of the frame. Note the tapered surface at 55e which rides against the upstanding leg 33 of the stick holder member 26. While the second cam 55b to open up the first stick holder member 25 is not always needed it is here shown and is of the general shape and nature as described for the second cam 55a. In the modified form shown in Fig. 5 there is shown a side track member 12a as an extension portion of track 12 and positioned to extend opposite to cam means portion 152. A downturned smooth lip portion of the track is shown at its advanced end at 12b.

Reference to Figs. 23 through 26 which are sections along respective section lines of Fig. 2 show the progress of the cam operations of the structure of Figs. 2 and 3, in opening and closing the stick holder members as the mold supporting them is moved along by the chain 14 in its progress from the left to right as viewed in Figs. 1 and 2. In Figs. 1 and 2 the stick S is assumed to be positioned in the vertical central plane which extends longitudinally through the center of the mold M. This stick S clears the second cam 55 which cam acts to open up the second stick holder 26 as shown in the broken line position in Fig. 23. As the apex 55' of the cam 55 strikes the leading leg 33 of the stick holder member 26 it will be observed in Fig. 25 that the two stick holder members 25 and 26 are being pivoted to the open position.

Reference to Figs. 26 and 27 shows the condition of a stick S' which has become moved to the left of the center of the longitudinal plane through the mold M. In such a case if the mold with this stick embedded in the frozen confection therein is moved on through the machine it would strike against the leading edge 55' of the second cam 55 and cause an obstruction wherein the stick would be torn or damage would be done to the machine. To take care of this condition, a cam portion 52' in the form of a concave surface edge in the cam section 52 is provided and this cam portion 52' is intermediate the first cam designated 53, see broken line portion of Fig. 22, and the second cam designated 55 as best shown in Fig. 3 as respects longitudinal movement of the mold and stick therein moving from left to right in Fig. 3. Thus, if the abnormal stick S' extends or is bent over to the left as shown in Fig. 26 as it approaches the intermediate cam portion 52' between first cam 52 and second cam 55, see Fig. 3, it hits the cam portion 52' and is moved to the right as shown in Fig. 27 as it approaches the straight portion 51' of the bracket 51 supporting the cams so as to fully clear the apex of second cam 55' and the whole cam 55 without doing any damage thereto.

*Sticker for moving sticks into stick holders above molds*

Figs. 16–21 inclusive, are directed to the sticker generally indicated at 18 as shown in Fig. 1 and used in connection with the confection machine for inserting sticks S in between the stick holders 25 and 26 above the molds M as they pass beneath the sticker. The confection machine has an intermittent movement wherein it moves the endless chain with the molds M thereon in a step by step fashion so that there is a pause or stationary condition of the chain as it brings each successive mold M under the sticker 18. This is generally shown in the diagram of the electrical and pneumatic system for the sticker and the prime mover for the machine shown in Fig. 31. When the prime mover PM, a piston and cylinder mechanism, is in non-operating position or condition the sticker cylinder and piston SC has a movement of the piston down to insert a stick or sticks along with a retracting movement so that the pusher fingers are positioned above the next moved up stick or sticks to be inserted.

In Fig. 16 the frame portion FR' of the confection machine is shown broken away at the righthand side but it supports the sticker generally indicated at 18. The lefthand end of the sticker 18 is supported by leg 70, see Fig. 17. Leg 70 and frame FR' support the horizontal framework comprised of longitudinal angle bars 71 having suitable cross-framing angle bars 72, see Fig. 19. These frame members 71 and 72 support bed plate 73 or as alternative construction as a support member a fairly wide channel iron member may be used. The main purpose of this sticker assembly 18 is to provide mounting for a tray, to be described, containing rows of sticks such that a row or rows may be brought into feeding position while alternate standby rows are filled with replacing sticks and thus the machine is not interrupted for reloading.

Supported on the bed plate 73 toward each end are suitable transverse guide bars 74 and 75. A secondary bed plate 80 of narrower width than bed plate 73 has depending legs affixed thereto at either side in a form of elongated strips 81 as shown in Fig. 19 and these are notched to fit over the transverse guide bars 74 and 75, shown in Figs. 16 and 17. Thus, the secondary bed plate 80 may be moved transverse of bed plate 73. In order to provide for adjustment, screw rod 82 is positioned at the longitudinal center and transverse to the bed plate 80 and is received in threaded bushings 81' in the elongated legs 81 while the ends of the screw 82 are supported in pillow boxes 83 secured at each side of the bed plate 73. A hand wheel 84 is provided on the screw 82 such that rotary adjustment thereof will move the bed plate 80 on the bed plate 73. To provide for limiting the sideways movement of plate 80 and the structure thereon, angle clips 76 and 77 are secured by cap screws 78 in transverse slots 79. The clips 76 and 77 are bifurcated to receive the screw rod 82. Bed plate 80 is formed with an upstanding dove-tail shaped male portion 80', see Fig. 19, which extends throughout a portion of its lefthand half to form a mating member for the female portion of the joint indicated at 85 in an upstanding slide 86. Also mounted for transverse adjustment with bed plate 80 is a power cylinder 87 of the double acting type having a piston rod 88 which is securely fastened at its outer end to the upstanding slide member 86. Bed plate 73 has transverse slots therein each of which receives a depending rod 89 secured to the underneath side of the secondary bed plate 80. The lower end of each rod 89 is threaded to receive a hand wheel 90 which is used to tighten against transverse bar members 72 so that the secondary bed plate 80 is held securely in adjusted position. Thus, to move the bed plate 80 it is necessary to slack off on hand wheels 90 before hand wheel 84 is turned to provide for transverse movement of the secondary bed 80. Bed plate 80 has at its righthand end, see Fig. 17, spaced apart upstanding supports 91 and 92 on either side which support trough generally indicated at 93 and having a U-shaped cross-section, see Figs. 17, 18, and 19, which has longitudinal upstanding side members 93′ and 93″ that have spaced apart bushings 94 welded therein. Received in the bushings 94 are transverse support rods 95 which slide therein and which have fixedly attached thereto, as by welding at 95′, a tray 96. Tray 96 has four longitudinal slots 96—1, 96—2, 96—3 and 96—4 therein which are of an elongated cross sectional shape so as to receive the relatively narrow in width and thin in thickness sticks S. Rods 95 have secured to the outer end thereof longitudinal strap members 97 and 98 respectively which serve as operating strap bars for solenoid actuators 101 and 102 to be described. Also threaded over rods 95 are movable collars 99 which may be secured in an adjusted position to limit sliding movement of the rods 95 and in turn the transverse movement of the tray 96. These collars 99 are provided with set screws so that they may be tightly secured in an adjusted position on the rods 95.

In Fig. 17 the solenoid 101 is shown secured to the upper portion of the trough member 93 and its armature 101′ is connected to the operating bar 97, see Fig. 16; in like manner the solenoid 102 has its armature 102′ connected to the operating bar 98 on the other side of the assembly. By energizing solenoid 101 tray 96 is moved to the left as shown in Fig. 19 so as to line up certain desired slots of slots 96—1 to 96—4 with fingers and slots to be described for the stick pusher.

Reference to Fig. 16 shows an end plate 103 attached to the trough like member 93 and it is provided with spaced apart bushings 104 which receive stick pusher rods 105 and 106 secured at their outer ends to the upper portion of the upstanding slide 86 and carrying on their inner ends transverse elongated plates 105′ and 106′ of a similar width to that of the sticks S and slidable within the elongated slots or stick troughs 96—1 through 96—4 when aligned therewith so as to push the row of sticks S carried in a vertical position in the troughs. Thus, when the upstanding slide member 86 is motivated by the piston rod 88 attached to the power cylinder 87, the respective rows of sticks are moved to the right as viewed in Figs. 16, 17, and 18. Reference to Fig. 18 shows that the extreme righthand stick of the stack or row of sticks lies in a vertical plane passing through the longitudinal center of the mold M positioned therebelow so that when the stick is pushed downwardly by the finger assembly 116 it is inserted into the stick holder members 26 and 27 and projected down into the mold as shown in the two positions in Figs. 28 and 30. In Fig. 18, frame portion FR″ of the confection machine is shown as extending in a vertical attitude and it has secured thereto on its lefthand side, as shown in Fig. 20, a plate 113 of rectangular shape of the width of trough 93. This plate 113 has spaced apart vertical slots 114 and 115 cut in its lefthand face, as best shown in Fig. 20, of a width sufficient to receive and guide the sticks S therein. The spacing of these slots 114 and 115 is the same as the spacing or the distance between two troughs such as 96—1 and 96—3.

In Fig. 17 the stick power cylinder SC of the pneumatic type is shown mounted on the upstanding frame portion FR″. This cylinder SC may be adjustably mounted for movement in a vertical direction so as to position its vertical height and in turn the pusher finger assembly generally indicated at 116. The fingers 116′ and 116″ are best shown in Fig. 19. They move in slots 114 and 115 respectively, see Fig. 20, and have a head 117 thereon which is apertured to receive the piston rod 118 that is secured thereto with the lock nuts 118′ and 118″ and thus further adjustment of the bifurcated pusher finger assembly 116 may be made by means of adjusting the head 117 on the threaded rod 118. If it is desired to use a single row of sticks S, see Fig. 19, as at row 96—1 this row or trough is positioned under the finger 116′ and the tray adjusted so that the auxiliary trough 96—2 may be filled while 96—1 is being emptied. Upon depletion of the sticks in trough 96—1 pusher rod 106 and its head 106′ move to the extreme right and into the vertical slot 114, see Fig. 20, whereupon the plunger of contact switch 120 is moved by the upstanding slide member 86, see Figs. 17 and 31, so that a circuit is completed from the power line L1—L2 to the four-way solenoid valve generally indicated at 121. Cylinder 87 is connected to the four-way soleniod operated air valve 121 by means of power lines 87′—87″ and air is admitted under pressure from the supply line 122 through the valve 121 and thence the power line 87′ to move the piston rod 88 to the left and carry with it the upstanding slide 86 which moves to the left as shown in Fig. 17. The solenoid operated valve 121 has electrical connection terminals $a$, $b$, and $c$. Terminal $a$ is connected by connector 123 to one side of switch 120 while the other side of switch 120 is connected by connector 124 to the power line side L1. The other side L2 of the line is connected by a connector 125 to terminal $c$ on the valve 121. Mounted on an upstanding bracket 126 on the bed plate 73, see Fig. 17, are three switches 127, 128, and 129 which are of a type that are "on and off" when their plungers are moved. These switches 127, 128, and 129 are in the path of movement of the upstanding slide member 86 and their plungers are actuated thereby. Switch 127 is connected by connector 130 on one side to the terminal $b$ on the four-way solenoid operated valve 121 while the other side of the switch 127 is connected by connector 131 to the line 124 leading to power line L1 as at 131′ A common connector 132 connects power line L1 to one terminal of each of switches 128 and 129 as at 132′ and 132″. Switch 128 has its other terminal connected by connector 133 to one side of the solenoid 101 while the other side of the solenoid is connected by connector 134 to a common connector line 135 leading to power line L2 and to one side of the other solenoid 102 for operating the trough 96. Switch 129 has its remaining terminal connected by connector 136 to the other terminal of solenoid 102.

In operation when the double acting power actuating mechanism PM of the pneumatic type is in a stop position and thus the conveyor chain 14 is in a stop condition, power cylinder SC for the stick actuating fork 116 moves downward and as the power cylinder PM is actuated, the piston rod 118 of power cylinder moves upward and withdraws the pusher assembly 116 from the slots 114 and 115 so that it is clear of any of the stick holders mounted on the molds M which pass therebelow by movement of chain 14 to which they are attached.

In Fig. 32 there is shown a modified form of actuator for the stick tray generally indicated at 93. A single power cylinder and piston arrangement 138 is utilized instead of the solenoids 101 and 102 at either side of the stick tray. The piston rod 141 of the power cylinder 138 has slipped thereover a collar 142 secured in adjusted position along the rod by a set screw 143. Fixed to collar 142 is an upstanding arm 144 which is apertured to receive a tap screw 145 which secures it to the adjacent end of the strap member 98 on the cross rods 95 supporting the stick tray 96. Thus, this one double acting power cylinder 138 through the valve actuator 137 serves to move the tray back and forth. Valve actuator 137 is similar to the actuator 121 shown in Fig. 31 and is controlled by the switches 128 and 129 which are actuated in the same manner as set forth above for Fig. 31.

Since it is obvious that certain further changes can be made in the foregoing constructions and arrangements without departing from the spirit and scope of this invention, it is intended that all matter shown in the accompanying drawings or described hereinbefore shall be interpreted as illustrative and not in a limiting sense.

I claim as my invention:

1. In a confection machine having an endless conveyor and individual spaced apart molds for confections to be frozen therein and carried by the conveyor, the combination therewith, of first and second stick holder members pivotally mounted above each mold for pivotal movement in opposite directions transverse to the direction of mold movement with said conveyor, said stick holder members supporting therebetween a stick to be frozen in the confection in said mold, the first of said members having a catch attached thereto and movable therewith for latching cooperation with the second of said members to hold said members together in closed position, cam means positioned adjacent said endless conveyor and adjacent said first and second stick holder members for unlatching said catch, pivoting said stick holder members to open position to permit removal of the frozen confection by grasping and pulling on said stick and to pivot said stick holder members to closed position whereupon said catch is latched and said stick holder members are ready to receive another stick therebetween, said cam means comprising a first cam means portion against which said catch passes to unlatch the same permitting said first member to pivot to open position, a second cam means portion for pivoting the second holder member to open position, and a third cam means portion for pivoting said stick holder members towards each other to closed position to cause said catch to latch and hold said members together.

2. In a confection machine having an endless conveyor and individual spaced apart molds for confections to be frozen therein and carried by the conveyor, the combination therewith, of first and second stick holder members pivotally mounted above each mold for pivotal movement in opposite directions transverse to the direction of mold movement with said conveyor, said stick holder members supporting therebetween a stick to be frozen in the confection in said mold, the first of said members having a catch attached thereto and movable therewith for latching cooperation with the second of said members, cam means positioned adjacent said first and second stick holder members for unlatching said catch, pivoting said members to open position to permit removal of the frozen confection by grasping and pulling on said stick and to pivot said members to closed position whereupon said catch is latched and said members are ready to receive another stick therebetween, said cam means comprising a first cam means portion against which said catch passes to unlatch the same permitting said stick holder members to pivot to open position, a pair of second cam means portions for pivoting and holding said respective stick holder members in open position, and a third cam means portion for pivoting said stick holder members towards each other to closed position to cause said catch to latch and hold said members together.

3. A confection machine of the character described in claim 2 including a fourth cam means portion positioned adjacent said third cam means portion and adapted to press against said catch upon pivotal closing of said stick holder members together to insure that said catch is moved to latching position to hold said members pivoted together.

4. In a confection machine having an endless conveyor and individual spaced apart molds for confections to be frozen therein and carried by the conveyor, the combination therewith, of first and second stick holder members pivotally mounted above said molds for pivotal movement in opposite directions transverse to the direction of mold movement with said conveyor, said stick holder members supporting therebetween a stick to be frozen in the confection in each mold, the first of said members having a catch attached thereto and movable therewith for latching cooperation with the second of said members to hold said members together in closed position, cam means positioned adjacent said endless conveyor and adjacent said first and second stick holder members for unlatching said catch, pivoting said members to open position to permit removal of the frozen confection by grasping and pulling on said stick and to pivot said members to closed position whereupon said catch it latched and said members are ready to receive another stick therebetween, said cam means comprising a first cam means portion against which said catch passes to unlatch the same, said first cam means portion having a downwardly extending portion slanting downwardly opposite to the direction of movement of said mold and pivoting the second stick holder member towards closed position should said last-mentioned member happen to be in an open position on approaching said first cam means portion and thereby riding against said downwardly extending portion, a second cam means portion for pivoting said second stick holder member to open position after it has passed said first cam means portion, means for holding said stick holder members in open position, and a third cam means portion for pivoting said members towards each other to closed position to cause said catch to latch and hold said members together.

5. A confection machine of the character described in claim 4 including biasing means pressing against a portion of said third cam means portion urging said stick holder members into closed position against each other.

6. A confection machine of the character described in claim 5 including stick cam means intermediate said first and second cam means portions for cooperation with said stick in said mold to bend it towards a central vertical position in said mold should said stick be extending from a frozen confection in said mold in the path of said second cam means portion whereby said stick is bent away from said second cam means portion and towards the vertical center of said mold so that the stick will clear said second cam means portion.

7. In a confection machine having an endless conveyor and individual spaced apart molds for confections to be frozen therein with sticks extending upward from the molds and the confections, the combination therewith, of first and second stick holder members pivotally mounted above said molds for pivotal movement in opposite directions transverse to the direction of mold movement with said conveyor, said stick holder members supporting therebetween sticks to be frozen in confections in said molds, means holding said members in closed position, a first cam means portion positioned adjacent said endless conveyor and adjacent said first and second stick holder members for releasing said means holding said members in closed position, a second cam means portion associated with said second stick holder member for pivoting said last named member to open position and a third cam means portion pivoting said members towards each other to closed position.

8. A confection machine of the character described in claim 7 including cam means disposed intermediate said second and third cam means portions for holding said stick holder members in open position while a frozen confection is being pulled from said mold.

9. In a confection machine having an endless conveyor with molds for forming frozen confections attached thereto in spaced apart relation, first and second stick holder members pivotally mounted above each of said molds for pivotal movement in opposite directions transverse to the direction of mold movement with the conveyor, said stick holder members supporting therebetween a stick to be frozen in the confection in said mold, means holding said members in closed position, first cam means positioned adjacent said endless conveyor and adjacent said first and second stick holder members for releasing said means holding said members in closed position permitting them to pivot to open position, second cam means positioned in the path of at least one of said holders for pivoting same to open position, a stick inserting means positioned adjacent said conveyor for inserting a stick between said stick holder members and in a vertical position in said mold below the stick holders, and third cam means positioned adjacent said conveyor and said stick inserting means for pivoting said stick holder members to closed position to receive a stick therebetween from said stick inserting means.

10. A confection machine of the character described in claim 9 including biasing means pressing against a portion of said third cam means adjacent said stick inserter means urging said stick holder members into tightly closed position while said sticks are being inserted in said molds by said stick inserting means.

11. A mold and mold supporting bracket assembly for a confection machine having an endless conveyor, a mold supporting bracket of U-shape having a pair of outwardly extending legs and a bight portion, said bight portion being adapted for attachment to said endless conveyor so that said legs extend out parallel to each other and transverse to the direction of movement of said conveyor, said legs and bight of the U-shaped bracket having a slot extending from the inner face of the legs and bight inwardly in a plane within which said bracket lies and a confection mold having an annular flange of rectangular-like shape forming an open upper end for the mold and having downwardly depending sidewalls and a bottom, said flange being readily insertable and withdrawable from said slots in said bracket.

12. A mold and mold supporting bracket assembly as described in claim 11 wherein said bracket and the flange of said mold have cooperating catch means for holding said mold in inserted position in said bracket.

13. In a confection machine, the combination of a U-shaped mold receiving bracket, said bracket having a pair of legs and a bight portion, said bight portion having means adapted to attach it to an endless conveyor whereby said legs project out from the conveyor in a generally horizontal disposition, said legs having mold receiving means thereon to receive and support a mold therebetween, a mold having a body portion with a vertically disposed confection and stick receiving cavity therein and transversely extending flanges at the top of the body portion adapted to be received and supported by said mold receiving means on the legs, first and second stick holder members pivotally attached at their ends to the legs, said stick holder members when pivoted together adapted to frictionally support a stick for a confection inserted therebetween and into said mold therebelow, and releasable means for holding said stick holder members together to support the stick inserted vertically therebetween.

14. In a confection machine according to claim 13 wherein said mold receiving means on the legs comprises elongated recesses formed into the legs and positioned in each leg opposite the recess formed in the other leg whereby the flanges on the mold are slidably received therein.

15. In a confection machine according to claim 13 wherein said first stick holder member is a U-shaped frame having the ends of its legs pivotally connected to the adjacent legs of the mold support bracket, the bight portion of the U-shaped frame having when in a stick receiving position over the mold bracket downwardly and inwardly inclined spaced apart stick support plates projecting therefrom to a vertical plane through the center of the mold and between said first and second stick support members, said second stick support member being of U-shape with its legs pivotally attached at their bottom ends to the legs of the mold support bracket and having a downwardly and inwardly inclined stick support plate extending as the bight portion cooperating with the like stick support plates on the first member to support a stick vertically therebetween, said second stick support member also including a biasing means disposed adjacent said stick support plate of the second stick support pivoted member to press against a stick and hold it frictionally in a vertical position between said stick support members and the stick support plates thereof.

16. In a confection machine of the character described in claim 15 wherein said releasable means for holding said stick holder members together to support the stick insertable vertically therebetween comprises a relatively rigid metallic strap member fixed at one end to the top portion of one of said stick support members, and extends transversely over the other stick supporting member when the stick support members are pivoted to stick supporting position, said strap member having the other end formed with a catch portion adapted to snap over the adjacent portion of said other member to hold said stick support members together, said strap having an extension projecting therefrom offset and generally parallel to the strap portion adjacent the catch portion, said projecting extension adapted to be a cam engaging portion for releasing said catch to allow said stick support members to pivot apart.

17. A mold assembly to be carried by an endless conveyor chain of a confection machine comprising, in combination, a vertically disposed mold, a bracket means attachable to said chain and having an aperture therein to receive said mold, said mold having an open top and a vertically extending molding cavity therein, a pair of elongated stick holder members each pivoted to said mold, said stick holder members having a plane of swing that extends above the top of the mold when it is positioned in the bracket means, said stick holder members having affixed thereto elements projecting inwardly towards each other and between which a stick for a confection is held so as to project upward above the stick holder members and downward into said mold cavity and holding means cooperating with said stick holder members biasing them towards each other but permitting them to pivot away from each other to permit a stick and a frozen confection thereon to be withdrawn upwardly from the mold and between said pivoted away stick holder members and the mold to be refilled with liquid.

References Cited in the file of this patent

UNITED STATES PATENTS

| | | |
|---|---|---|
| 1,924,224 | West | Aug. 29, 1933 |
| 1,939,109 | Davidson | Dec. 12, 1933 |
| 1,953,506 | Schnaier | Apr. 3, 1934 |
| 1,960,456 | Robb | May 29, 1934 |
| 2,251,333 | Griffin et al. | Aug. 5, 1941 |
| 2,313,500 | Anderson | Mar. 9, 1943 |
| 2,614,510 | Heise | Oct. 21, 1952 |